(12) United States Patent
Paladugu et al.

(10) Patent No.: US 11,844,076 B2
(45) Date of Patent: Dec. 12, 2023

(54) TECHNIQUES FOR MULTIPLEXING REMOTE UE RRC MESSAGES IN A WIRELESS COMMUNICATION SYSTEM

(71) Applicant: QUALCOMM Incorporated, San Diego, CA (US)

(72) Inventors: Karthika Paladugu, San Diego, CA (US); Hong Cheng, Basking Ridge, NJ (US); Gavin Bernard Horn, La Jolla, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 17/138,129

(22) Filed: Dec. 30, 2020

(65) Prior Publication Data

US 2021/0204274 A1 Jul. 1, 2021

Related U.S. Application Data

(60) Provisional application No. 62/955,785, filed on Dec. 31, 2019.

(51) Int. Cl.
*H04W 72/21* (2023.01)
*H04L 69/22* (2022.01)
*H04W 88/04* (2009.01)

(52) U.S. Cl.
CPC ............ *H04W 72/21* (2023.01); *H04L 69/22* (2013.01); *H04W 88/04* (2013.01)

(58) Field of Classification Search
CPC ............ H04L 69/22; H04L 27/2602; H04W 72/0413; H04W 88/04
See application file for complete search history.

(56) References Cited

U.S. PATENT DOCUMENTS

| 2018/0279202 A1* | 9/2018 | Tenny ............... H04W 40/246 |
| 2019/0394816 A1 | 12/2019 | Kim |
| 2020/0100308 A1* | 3/2020 | Lee .................. H04W 76/25 |
| 2020/0413457 A1 | 12/2020 | Hong |
| 2021/0212151 A1* | 7/2021 | Paladugu ............ H04W 76/28 |

FOREIGN PATENT DOCUMENTS

| KR | 20190098692 A | 8/2019 |
| WO | 2018143763 A1 | 8/2019 |

OTHER PUBLICATIONS

International Search Report and Written Opinion issued in corresponding International Application No. PCT/US2020/067689 dated Apr. 22, 2021.

* cited by examiner

*Primary Examiner* — Basil Ma
(74) *Attorney, Agent, or Firm* — QUALCOMM Incorporated

(57) ABSTRACT

In an aspect, the present disclosure includes a method, apparatus, and computer readable medium for wireless communications for receiving, by a relay user equipment (UE) from a remote UE, a remote UE radio resource control (RRC) message for establishing a relayed communication between the remote UE and a network entity via the relay UE; determining, by the relay UE, remote UE information associated with the remote UE for establishing a remote UE communication context between the relay UE and the network entity based on the remote UE RRC message; and transmitting, by the relay UE to the network entity, the remote UE RRC message and the remote UE information.

30 Claims, 9 Drawing Sheets

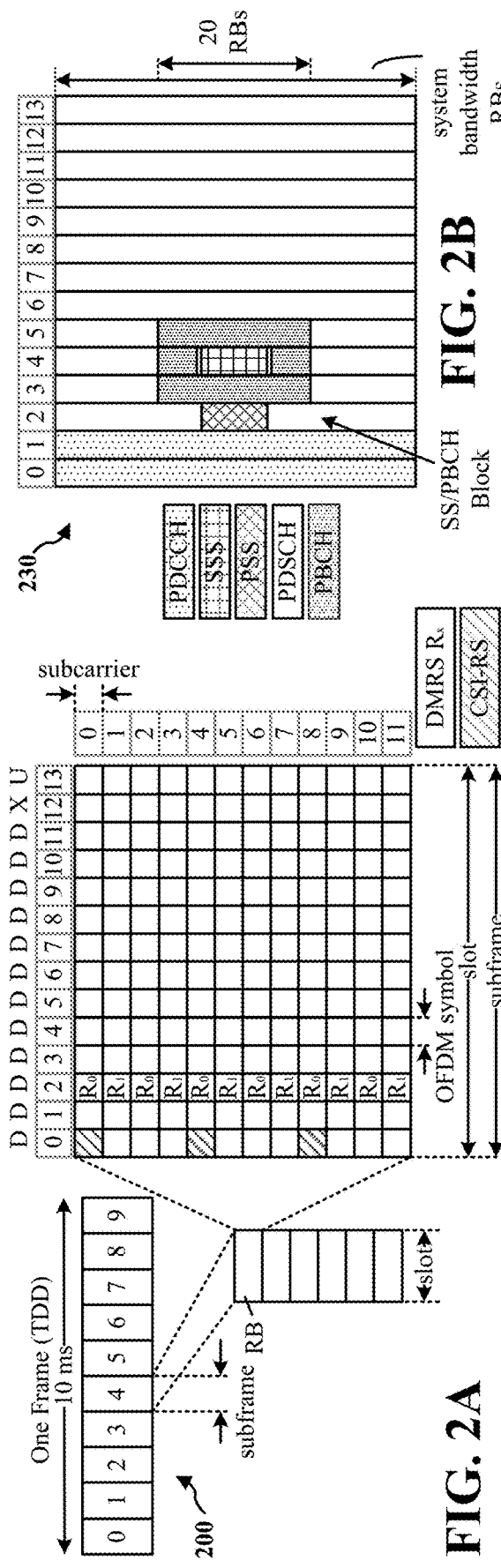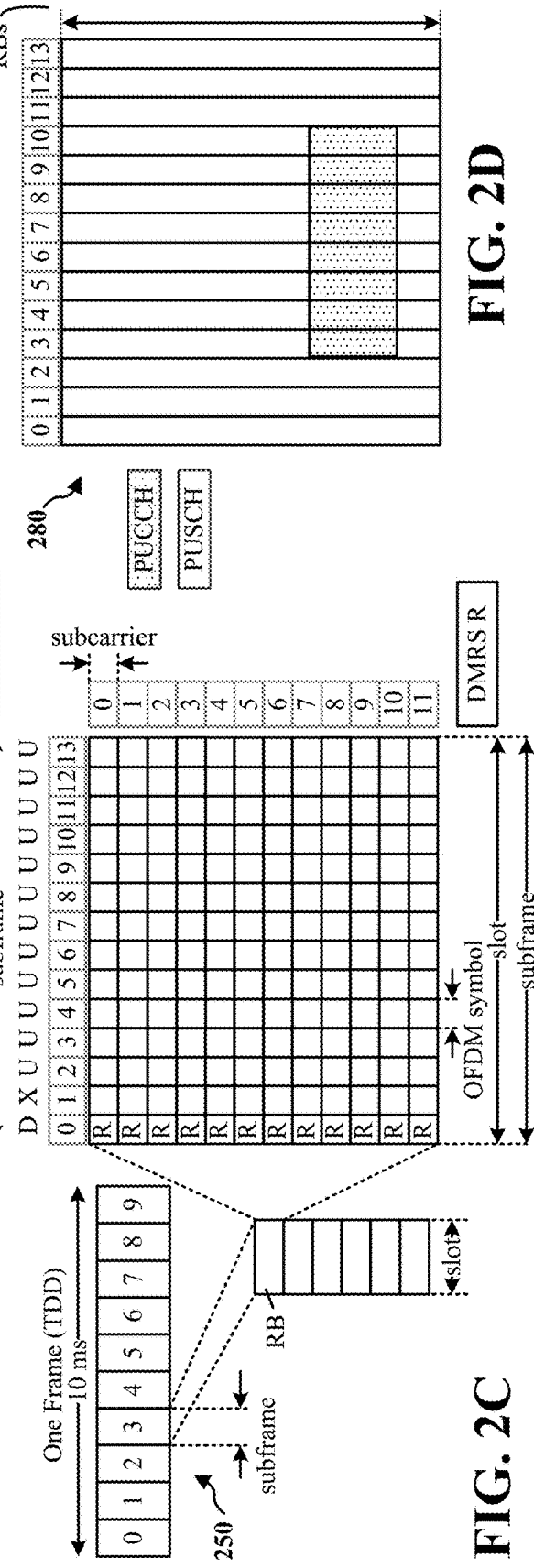

TECHNIQUES FOR MULTIPLEXING REMOTE UE RRC MESSAGES IN A WIRELESS COMMUNICATION SYSTEM

CROSS-REFERENCE TO RELATED APPLICATION(S)

The present application claims benefit of U.S. Provisional Application No. 62/955,785 entitled "TECHNIQUES FOR MULTIPLEXING REMOTE UE RRC MESSAGES IN A WIRELESS COMMUNICATION SYSTEM" filed Dec. 31, 2019, which is assigned to the assignee hereof and hereby expressly incorporated by reference herein.

BACKGROUND

The present disclosure relates generally to communication systems, and more particularly, to relay user equipment (UE) Uu control plane changes to multiplexing multiple remote UE radio resource control (RRC) messages in fifth generation new radio (5G NR).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies. Due to the increasing demand for wireless communications, there is a desire to improve the efficiency of wireless communication network techniques.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication, including receiving, by a relay user equipment (UE) from a remote UE, a remote UE radio resource control (RRC) message for establishing a relayed communication between the remote UE and a network entity via the relay UE; determining, by the relay UE, remote UE information associated with the remote UE for establishing a remote UE communication context between the relay UE and the network entity based on the remote UE RRC message; and transmitting, by the relay UE to the network entity, the remote UE RRC message and the remote UE information.

In a further example, an apparatus for wireless communication is provided that includes a transceiver, a memory configured to store instructions, and one or more processors communicatively coupled with the transceiver and the memory. The one or more processors are configured to execute the instructions to receive, by a relay UE from a remote UE, a remote UE RRC message for establishing a relayed communication between the remote UE and a network entity via the relay UE; determine, by the relay UE, remote UE information associated with the remote UE for establishing a remote UE communication context between the relay UE and the network entity based on the remote UE RRC message; and transmit, by the relay UE to the network entity, the remote UE RRC message and the remote UE information.

In another aspect, an apparatus for wireless communication is provided that includes means for receiving, by a relay UE from a remote UE, a remote UE RRC message for establishing a relayed communication between the remote UE and a network entity via the relay UE; means for determining, by the relay UE, remote UE information associated with the remote UE for establishing a remote UE communication context between the relay UE and the network entity based on the remote UE RRC message; and means for transmitting, by the relay UE to the network entity, the remote UE RRC message and the remote UE information.

In yet another aspect, a non-transitory computer-readable medium is provided including code executable by one or more processors to receive, by a relay UE from a remote UE, a remote UE RRC message for establishing a relayed communication between the remote UE and a network entity via the relay UE; determine, by the relay UE, remote UE information associated with the remote UE for establishing a remote UE communication context between the relay UE and the network entity based on the remote UE RRC message; and transmit, by the relay UE to the network entity, the remote UE RRC message and the remote UE information.

Another example implementation includes a method of wireless communication, including receiving, by a network entity from a relay UE, a remote UE RRC message for establishing a relayed communication between a remote UE and the network entity via the relay UE, wherein the remote UE RRC message includes remote UE information; establishing, by the network entity, a communication context between the remote UE, the relay UE, and the network entity based on the remote UE RRC message and the remote UE information; and transmitting, by the network entity to the relay UE, a second remote UE RRC message and the remote UE information.

In a further example, an apparatus for wireless communication is provided that includes a transceiver, a memory configured to store instructions, and one or more processors communicatively coupled with the transceiver and the memory. The one or more processors are configured to execute the instructions to receive, by a network entity from a relay UE, a remote UE RRC message for establishing a relayed communication between a remote UE and the network entity via the relay UE, wherein the remote UE RRC message includes remote UE information; establish, by the network entity, a communication context between the remote UE, the relay UE, and the network entity based on the remote UE RRC message and the remote UE information; and transmit, by the network entity to the relay UE, a second remote UE RRC message and the remote UE information.

In another aspect, an apparatus for wireless communication is provided that includes means for receiving, by a network entity from a relay UE, a remote UE RRC message for establishing a relayed communication between a remote UE and the network entity via the relay UE, wherein the remote UE RRC message includes remote UE information; means for establishing, by the network entity, a communication context between the remote UE, the relay UE, and the network entity based on the remote UE RRC message and the remote UE information; and means for transmitting, by the network entity to the relay UE, a second remote UE RRC message and the remote UE information.

In yet another aspect, a non-transitory computer-readable medium is provided including code executable by one or more processors to receive, by a network entity from a relay UE, a remote UE RRC message for establishing a relayed communication between a remote UE and the network entity via the relay UE, wherein the remote UE RRC message includes remote UE information; establish, by the network entity, a communication context between the remote UE, the relay UE, and the network entity based on the remote UE RRC message and the remote UE information; and transmit, by the network entity to the relay UE, a second remote UE RRC message and the remote UE information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
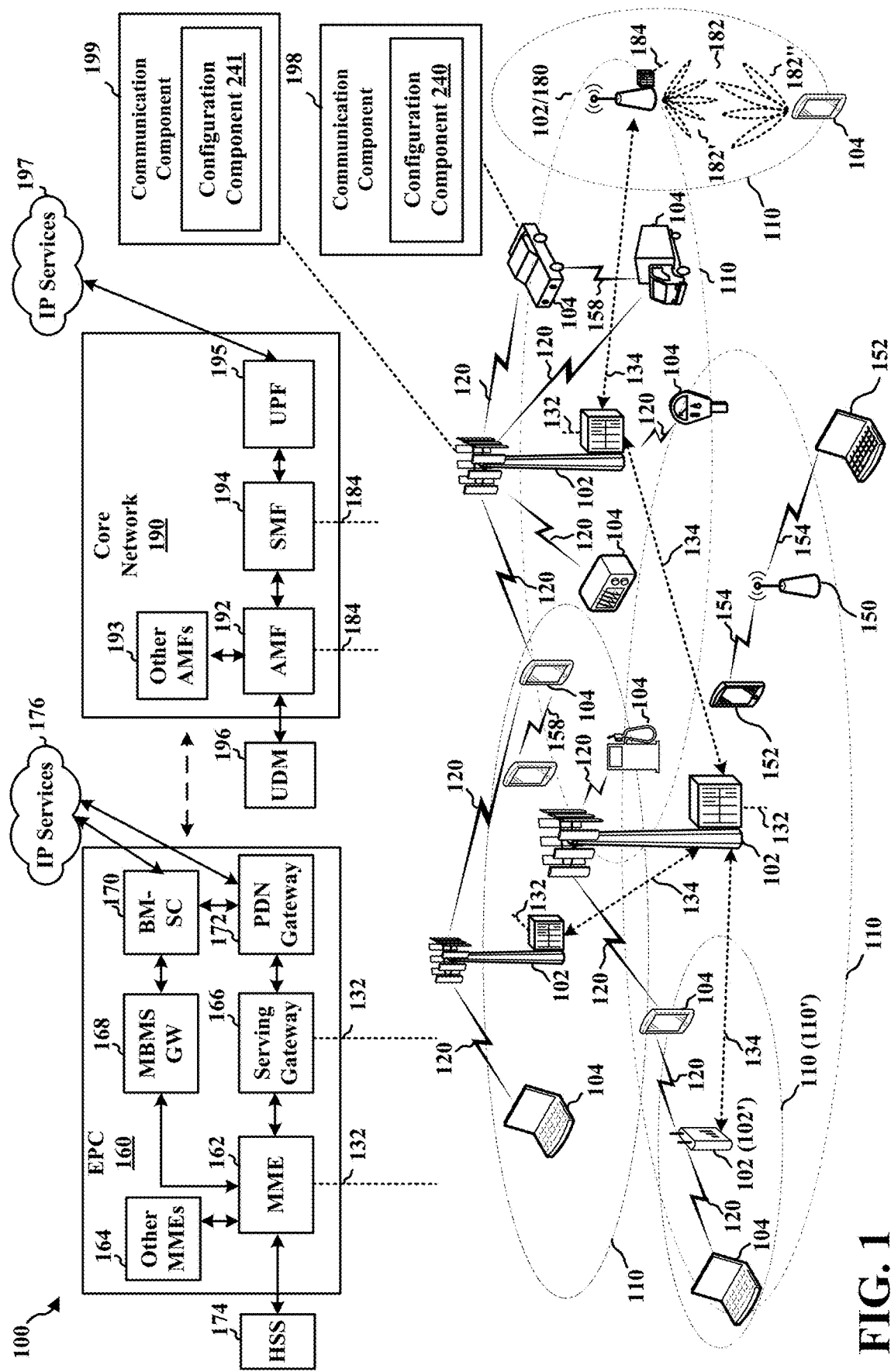
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The described features generally relate utilizing a relay user equipment (UE) to forward transmissions to a network. For example, a UE may be configured as a relay UE between one or more remote UEs and the network. The relay UE may receive transmissions from the remote UE and forward them to the network acting as an intermediary in order to provide the remote UE with network coverage. The present disclosure relates generally to current issues of a relay UE being configured to connect multiple remote UEs to the network. The described features relate to relay UE Uu control plane multiplexing multiple remote UE RRC messages in fifth generation new radio (5G NR).

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 configured for relay user equipment (UE) Uu control plane multiplexing multiple remote UE radio resource control (RRC) messages in fifth generation new radio (5G NR). The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may be configured to operate a communication component 198 and/or a configuration component 240 to transmit to a network entity, a radio resource control (RRC) configuration message indicating a full-duplex capability of the UE; receive, from the network entity, a DCI format message, wherein the DCI format message enables concurrent transmission on an uplink channel and reception on a downlink channel by the UE; and communicate, with the network entity, based on the DCI format message.

In another aspect, the UE 104 may correspond to a relay UE, and may be configured to operate the communication component 198 and/or a configuration component 240 to receive, from a remote UE, a remote UE radio resource control (RRC) message for establishing a relayed communication between the remote UE and a network entity via the relay UE; determine remote UE information associated with the remote UE for establishing a remote UE communication context between the relay UE and the network entity based on the remote UE RRC message; and transmit, to the network entity, the remote UE RRC message and the remote UE information.

Correspondingly, in certain aspects, the network entity 102 (e.g., base station) and/or another UE, such as UE 104, may be configured to operate a communication component 199 and/or a configuration component 241 to receive, from a relay UE, a remote UE RRC message for establishing a relayed communication between a remote UE and the network entity via the relay UE, wherein the remote UE RRC message includes remote UE information; establish a communication context between the remote UE, the relay UE, and the network entity based on the remote UE RRC message and the remote UE information; and transmit, to the relay UE, a second remote UE RRC message and the remote UE information.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104, and/or the secondary UEs (or sidelink UEs) 110 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
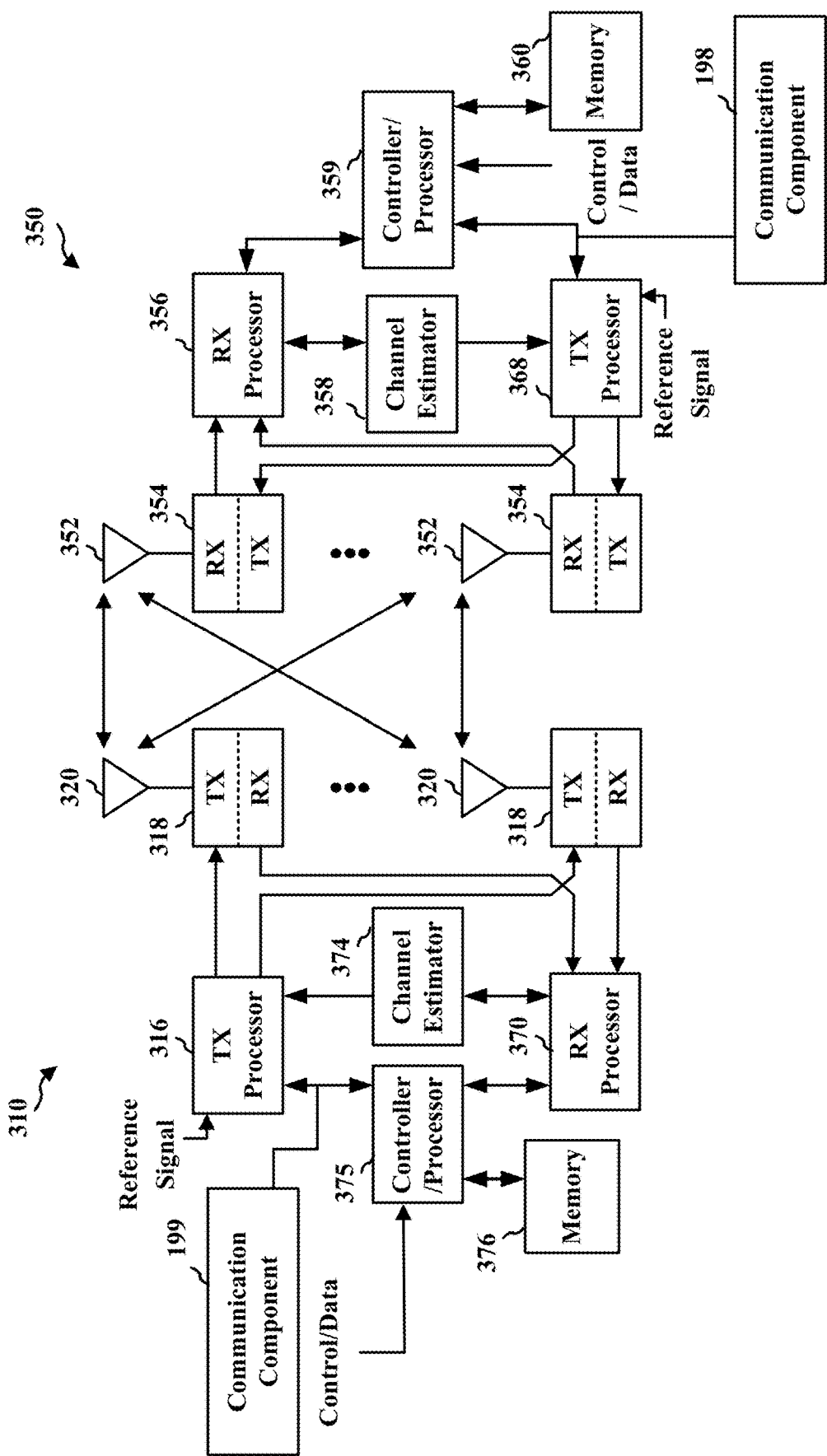
FIG. 3 is a diagram illustrating an example of a base station and user equipment (UE) in an access network.

FIG. 3 is a block diagram of a base station 310 in communication with a UE 350 in an access network, where the base station 310 may be an example implementation of base station 102 and where UE 350 may be an example implementation of UE 104. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with communication component 198 of FIG. 1.

At least one of the TX processor 316, the RX processor 370, and the controller/processor 375 may be configured to perform aspects in connection with communication component 199 of FIG. 1.

Referring to FIGS. 4-9, the described features generally relate to relay UE Uu control plane multiplexing multiple remote UE RRC messages in fifth generation new radio (5G NR). For example, a UE may be configured as a relay UE between a remote UE and the network. The relay UE may receive transmissions from the remote UE and forward them to the network acting as an intermediary in order to provide the remote UE with network coverage.

The present disclosure relates generally to current issues of a relay UE being configured to connect multiple remote UEs to the network. For example, in an aspect, the present disclosure includes a method, apparatus, and non-statutory computer readable medium for wireless communications for receiving, by a relay UE from a remote UE, a remote UE RRC message for establishing a relayed communication between the remote UE and a network entity via the relay UE; determining, by the relay UE, remote UE information associated with the remote UE for establishing a remote UE communication context between the relay UE and the network entity based on the remote UE RRC message; and transmitting, by the relay UE to the network entity, the remote UE RRC message and the remote UE information. In another aspect, for example, the present disclosure includes a method, apparatus, and non-statutory computer readable medium for wireless communications for receiving, by a network entity from a relay UE, a remote UE RRC message for establishing a relayed communication between a remote UE and the network entity via the relay UE, wherein the remote UE RRC message includes remote UE information; establishing, by the network entity, a communication context between the remote UE, the relay UE, and the network entity based on the remote UE RRC message and the remote UE information; and transmitting, by the network entity to the relay UE, a second remote UE RRC message and the remote UE information.

In an aspect, for L2 UE-to-NW relay, the adaptation layer is put over the RLC sublayer for both control plane (CP) and user plane (UP) between a relay UE, such as one of UE 104 and gNB, such as base station 102. For example, Uu service data adaptation protocol (SDAP)/packet data convergence protocol (PDCP) and RRC are terminated between a remote UE and gNB, while RLC, MAC and PHY are terminated in each link. The remote UE needs to establish its own PDU sessions/DRBs with the network before user plane data transmission.

In an aspect, for L2 UE-to-UE relay, an adaptation layer is supported over a PC5 link (e.g., between relay UE and receiving remote UE). For example, the adaptation layer is put over RLC sublayer for both CP and UP between relay UE and receiving remote UE for L2 UE-to-UE relay. The sidelink SDAP/PDCP and RRC are terminated between two remote UEs, while RLC, MAC and PHY are terminated in each PC5 link.

In an aspect, information may be located within the header of adaptation layer to enable bearer mapping for L2 UE-to-Network relay. For example, N-to-1 (PC5-to-Uu) bearer mapping may be supported.

In an aspect, for L2 UE-to-NW relay, the Uu adaptation layer at relay UE supports UL bearer mapping between ingress PC5 RLC channels for relaying and egress Uu RLC channels over the relay UE Uu path.

In an aspect, for L2 UE-to-NW relay, the different RBs of the same remote UE and/or different remote UEs may be subject to N:1 mapping and data multiplexing over Uu RLC channel.

In an aspect, for L2 UE-to-NW relay, Uu adaptation layer is used to support remote UE identification for the UL traffic (multiplexing the data coming from multiple remote UE).

In an aspect, for L2 UE-to-NW relay, the Uu adaptation layer may be used to support DL bearer mapping at gNB to map end-to-end Radio Bearer (SRB, DRB) of remote UE into Uu RLC channel over relay UE Uu path.

In an aspect, for L2 UE-to-NW relay, the identity information of remote UE Uu Radio Bearer and remote UE is included in the Uu adaptation layer at UL in order for gNB to correlate the received data packets for the specific PDCP entity associated with the right remote UE Uu Radio Bearer of a remote UE.

In an aspect, for L2 UE-to-NW relay, the Uu adaptation layer may be used to support DL N:1 bearer mapping and data multiplexing between multiple end-to-end Radio Bearers (SRBs, DRBs) of a remote UE and/or different remote UEs and one Uu RLC channel over the relay UE Uu path.

In an aspect, for L2 UE-to-NW relay, the Uu adaptation layer may support remote UE identification for DL traffic.

In an aspect, for L2 UE-to-NW relay, the identity information of remote UE Uu Radio Bearer and the identity information of remote UE needs be put into the Uu adaptation layer by gNB at DL in order for relay UE to map the received data packets from remote UE Uu Radio Bearer to its associated PC5 RLC channel.

Figure 4:
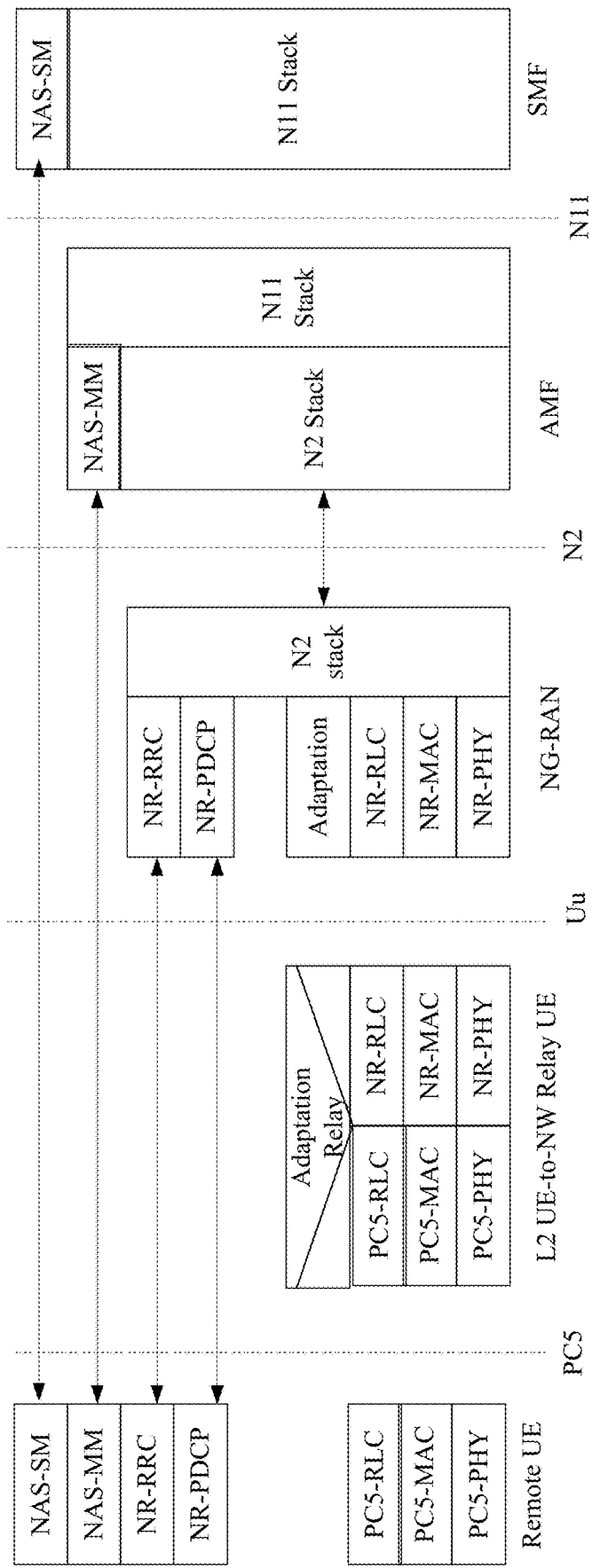
FIG. 4 is a diagram illustrating an example of a control plane for L2 UE-to-network relay UE.

FIG. 4 is a diagram 400 illustrating an example of a control plane for L2 UE-to-network relay UE architecture. For example, network access stratum (NAS) messages are transparently transferred between the remote UE and 5G-AN over the Layer 2 UE-to-Network Relay UE using packet data convergence protocol (PDCP) end-to-end connection where the role of the UE-to-Network Relay UE is to relay the packet data units (PDUs) over the signaling radio bear without any modifications, N2 connection between the 5G-AN and AMF over N2, and N3 connection AMF and SMF over N11.

In an aspect, multiple remote UEs may connect to the same relay UE over PC5, and the relay UE may relay the control plane traffic over the corresponding Uu signaling radio bearers (SRBs). That is, the relay UE may multiplex/aggregate different remote UEs RRC message to the Uu SRBs of the relay UE with the gNB (for control plane). To help the gNB and relay UE send the RRC messages to/from the remote UE, the remote UE identity and the remote UE bearer identity (e.g. SRB0, SRB1, SRB2, etc.) information may be included along with the remote UE RRC message. As described herein, additional information may be provided to assist the gNB and the relay UE details regarding which remote UE RRC messages are transferred over the Uu SRBs.

Figure 5:
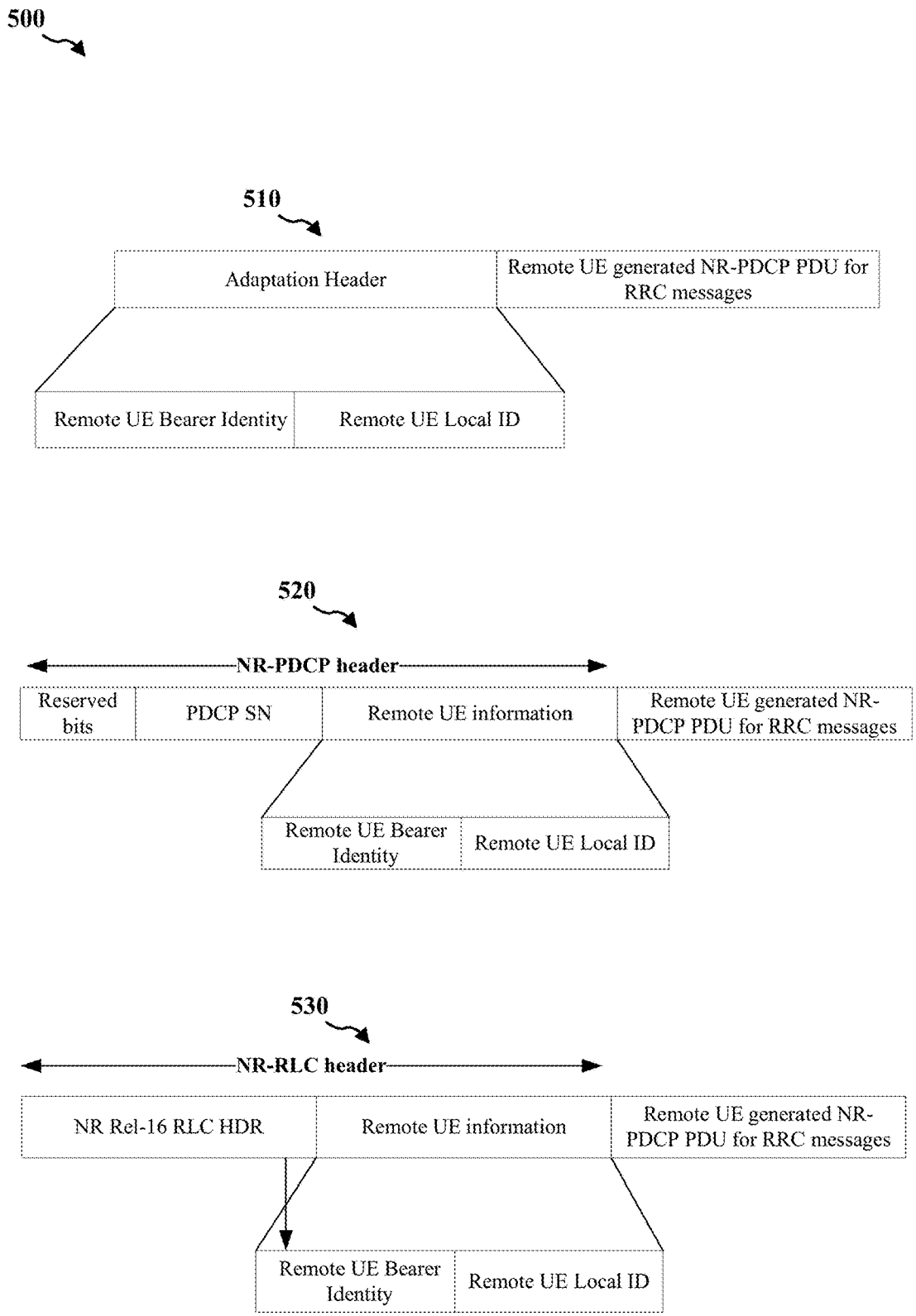
FIG. 5 is a diagram illustrating examples of remote UE RRC message multiplexing and identification configurations.

FIG. 5 is a diagram 500 illustrating examples of remote UE RRC message multiplexing and identification configurations. For example, configuration 510 includes the Remote UE information (e.g., Remote UE local ID, and Bearer Identity) being included in the adaptation layer header for the NR-PDCP PDU including the Remote UE RRC message. For configuration 520, the Remote UE information (e.g., Remote UE local ID, and Bearer Identity) may be included in the PDCP header for the NR-PDCP PDU including the Remote UE RRC message.

In an aspect, another configuration 530 may include the Remote UE information (e.g., Remote UE local ID, and Bearer Identity) and the Remote UE RRC message in control messages sent by the Relay UE to the network entity. For example, the control messages sent from the Relay UE to the network entity may be at least one of Release 16 RRC messages (e.g., UL Information Transfer and DL Information Transfer) enhanced to include the Remote UE RRC message as a container, new RRC messages (e.g., Remote UE UL information Transfer, Remote UE DL information Transfer), or new layer higher than the adaptation layer, that is used for relaying remote UE control messages between the network entity and Relay UE.

Figure 6:
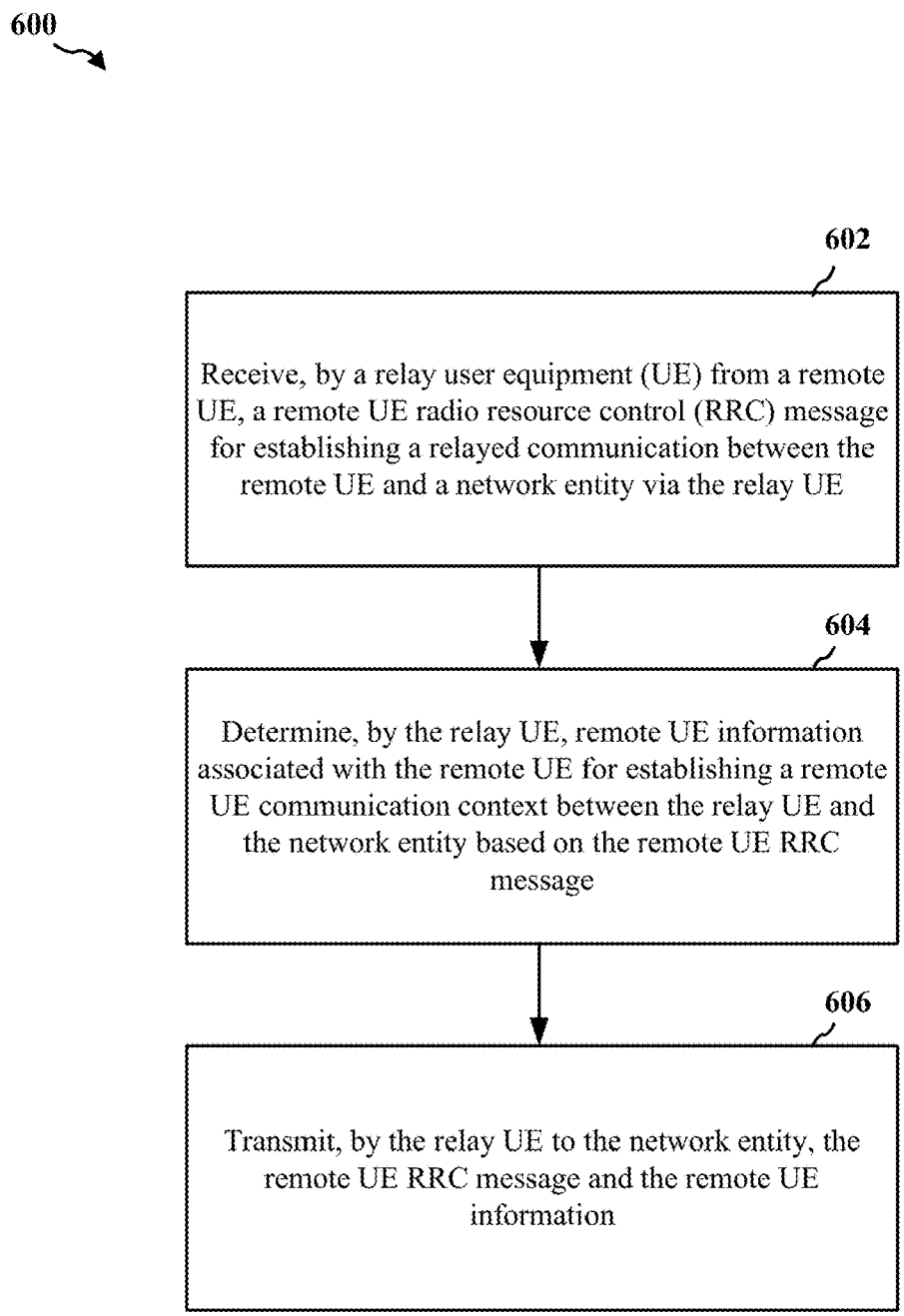
FIG. 6 is a flowchart of a method of wireless communication, and more specifically to relay UE multiplexing multiple remote UE radio resource control (RRC) messages.

FIG. 6 is a flowchart 600 of a method of wireless communication for example, relating to a relay UE Uu control plane multiplexing multiple remote UE RRC messages in 5G NR. The method may be performed by a UE (e.g., the UE 104; the apparatus 350; the controller/processor 359, which may include the memory 360, processor(s) 512, which may include the memory 516, modem 540 and which may be the entire UE 104 or a component of the UE 104, such as the TX processor 368, the RX processor 356, and/or the transceiver 502) in combination with the communication component 198/configuration component 240.

At 602, method 600 includes receiving, by a relay UE from a remote UE, a remote UE RRC message for establishing a relayed communication between the remote UE and a network entity via the relay UE. In an aspect, the UE 104 and/or the communication component 198/configuration component 240 may be configured to receive, from a remote UE, a remote UE RRC message for establishing a relayed communication between the remote UE and a network entity via the relay UE. As such, the UE 104 and/or the communication component 198/configuration component 240, e.g., in conjunction with controller/processor 359, which may include the memory 360, processor(s) 812, which may include the memory 816, modem 840, RX processor 356, and transceiver 802 may define a means for receiving, by a relay UE from a remote UE, a remote UE RRC message for establishing a relayed communication between the remote UE and a network entity via the relay UE. For example, in an aspect, the UE 104 and/or the communication component 198/configuration component 240 may receive a wireless signal, transmitted by the remote UE, at one or more antennae or antenna arrays, demodulate and decode the signal, and/or performs other signal receiving processes such as described above in FIG. 3, and thereby obtain the remote UE RRC message.

At 604, method 600 includes determining, by the relay UE, remote UE information associated with the remote UE for establishing a remote UE communication context between the relay UE and the network entity based on the remote UE RRC message. In an aspect, the UE 104 and/or the communication component 198/configuration component 240 may be configured to determine remote UE information associated with the remote UE for establishing a remote UE communication context between the relay UE and the network entity based on the remote UE RRC message. As such, the UE 104 and/or the communication component 198/configuration component 240, e.g., in conjunction with controller/processor 359, which may include the memory 360, processor(s) 812, which may include the memory 816, modem 840, RX processor 356, and transceiver 802 may define a means for determining, by the relay UE, remote UE information associated with the remote UE for establishing a remote UE communication context between the relay UE and the network entity based on the remote UE RRC message. For example, in an aspect, the UE 104 and/or communication component 198/configuration component 240 may process the remote UE RRC message and determine the remote UE information which may include a remote UE local identification and a remote UE bearer identity, and a dedicated remote UE RRC message information element for including the remote UE RRC message.

At 606, method 600 includes transmitting, by the relay UE to the network entity, the remote UE RRC message and the remote UE information. In an aspect, the UE 104 and/or the communication component 198/configuration component 240 may be configured to transmit, to the network entity, the remote UE RRC message and the remote UE information. As such, the UE 104 and/or the communication component 198/configuration component 240, e.g., in conjunction with controller/processor 359, which may include the memory 360, processor(s) 812, which may include the memory 816, modem 840, RX processor 356, and transceiver 802 may define a means for transmitting, by the relay UE to the network entity, the remote UE RRC message and the remote UE information. For example, in an aspect, the UE 104 and/or the communication component 198/configuration component 240 obtains data representing the remote UE RRC message and the remote UE information, performs modulation and coding, and/or performs other transmit processing as described above in FIG. 3, and transmits the data in a wireless signal via one or more antennae or antenna arrays.

In an example of method 600, the UE 104 and/or the communication component 198/configuration component 240 configured for transmitting the remote RRC message and the remote UE information is further configured for transmitting the remote UE information in an adaptation layer header for a NR PDCP packet data unit (PDU) including the remote UE RRC message, the remote UE information including a remote UE local identification and a bearer identity.

In an example of method 600, the UE 104 and/or the communication component 198/configuration component 240 may be configured for receiving, by the relay UE from the network entity, a second remote UE RRC message and the remote UE information at least in response to transmitting the remote UE RRC message and the remote UE information, and for transmitting, by the relay UE to the remote UE, the remote UE RRC message. For example, the UE 104 and/or the communication component 198/configuration component 240 configured for receiving the second remote UE RRC message and the remote UE information is further configured for receiving the remote UE information in an adaptation layer header for a NR PDCP PDU including the second remote UE RRC message.

In an example of method 600, the UE 104 and/or the communication component 198/configuration component 240 configured for transmitting the remote UE RRC message and the remote UE information is further configured for transmitting the remote UE information in at least one of a NR PDCP header or NR radio link control (RLC) header for a NR PDCP PDU including the remote UE RRC message.

For example, each of the at least one of the NR PDCP header or NR RLC header include at least a field for including the remote UE information.

In an example of method 600, the UE 104 and/or the communication component 198/configuration component 240 configured for receiving the second remote UE RRC message and the remote UE information is further configured for receiving the remote UE information in at least one of a NR PDCP header or NR RLC header for a NR PDCP PDU including the second remote UE RRC message.

In an example of method 600, the UE 104 and/or the communication component 198/configuration component 240 configured for transmitting the remote RRC message and the remote UE information is further configured for transmitting the remote RRC message and the remote UE information in one or more control message, the remote UE information including a remote UE local identification and a bearer identity.

In an example of method 600, the one or more control messages correspond to one or more RRC messages.

In an example of method 600, the one or more control messages correspond to one or more new layer messages located at a layer higher than an adaptation layer.

In an example of method 600, the UE 104 and/or the communication component 198/configuration component 240 is further configured for transmitting, by the relay UE to the network entity, an initial remote UE RRC message configured to trigger the network entity to initiate a remote UE context setup between the relay UE and the network entity, for receiving, by the relay UE from the network entity, a remote UE context setup request message based on transmitting the initial remote UE RRC message, and for transmitting, by the relay UE to the network entity, a remote UE context setup response message based on receiving the remote UE context setup request message.

For example, the remote UE context setup includes a remote UE context identification corresponding to the remote UE communication context of the remote UE. Further, a remote UE uplink/downlink RRC message transfer between the relay UE and the network entity utilizes the remote UE context identification. In an example, the remote UE context setup request message includes at least a sidelink (e.g., PC5) access stratum (AS) configuration utilized between the relay UE and the remote UE sidelink unicast link. In an example, PC5 corresponds to the reference point between the UEs, and includes the LTE based PC5 and/or NR based PC5. Further, the sidelink AS configuration includes at least one of a discontinuous reception (DRX) configuration, signaling radio bearer (SRB), dedicated radio bearer (DRB) configuration, and sidelink resource configuration.

In an example of method 600, the UE 104 and/or the communication component 198/configuration component 240 is further configured for initiating, by the relay UE, an uplink information transfer procedure in response to receiving the remote UE RRC message for establishing an uplink information transfer message to be transmitted on a Uu radio interface, and for transmitting, by the relay UE to the network entity, the uplink information transfer message. For example, the uplink information transfer messages comprises the remote UE information element including a remote UE local identification and a remote UE bearer identity, and a dedicated remote UE RRC message information element for including the remote UE RRC message.

In an example of method 600, the UE 104 and/or the communication component 198/configuration component 240 is configured for receiving, by the relay UE from the network entity, a downlink information transfer message in response to transmitting the uplink information transfer message, and for transmitting, by the relay UE to the remote UE, the downlink information transfer message. For example, the UE 104 and/or the communication component 198/configuration component 240 configured for transmitting the downlink information transfer message is further configured for transmitting a dedicated remote UE RRC message received in the downlink information transfer message to the remote UE indicated by a remote UE local identification on a corresponding PC5 bearer based on a remote UE bearer identity.

In an example of method 600, the UE 104 and/or the communication component 198/configuration component 240 configured for transmitting the remote RRC message and the remote UE information is further configured for transmitting a new RRC message including the remote UE information and the remote UE RRC message.

In an example of method 600, the UE 104 and/or the communication component 198/configuration component 240 configured for transmitting the remote RRC message and the remote UE information is further configured for transmitting the remote UE information and a dedicated remote UE RRC message received from the network entity via a new layer being higher than an adaptation layer.

Figure 7:
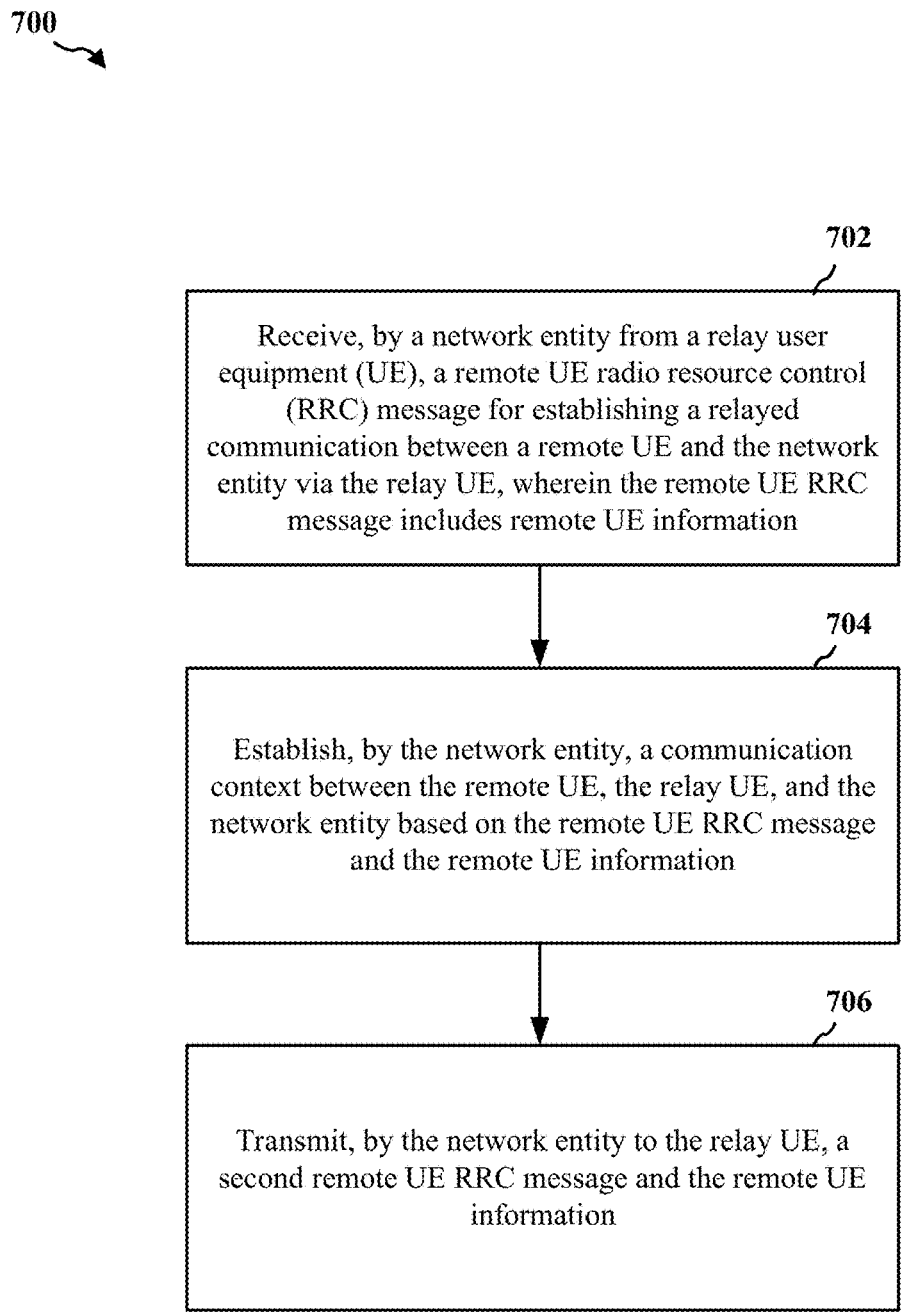
FIG. 7 is a flowchart of a method of wireless communication, and more specifically to a network entity establishing communication contexts with multiple remote UEs via a relay UE.

FIG. 7 is a flowchart 700 of a method of wireless communication for example, relating to a relay UE Uu control plane multiplexing multiple remote UE RRC messages in 5G NR. The method may be performed by a network entity (e.g., the base station 102; the apparatus 310; the controller/processor 375, which may include the memory 376, processor(s) 912, which may include the memory 916, modem 940 and which may be the entire base station 102 or a component of the base station 102, such as the TX processor 316, the RX processor 370, and/or the transceiver 902) in combination with the communication component 199/configuration component 241.

At 702, method 700 includes receiving, by a network entity from a relay UE, a remote UE RRC message for establishing a relayed communication between a remote UE and the network entity via the relay UE, wherein the remote UE RRC message includes remote UE information. In an aspect, the base station 102 and/or the communication component 199/configuration component 241 may be configured to receive, from a relay UE, a remote UE RRC message for establishing a relayed communication between a remote UE and the network entity via the relay UE, wherein the remote UE RRC message includes remote UE information. As such, the base station 102 and/or the communication component 199/configuration component 241, e.g., in conjunction with the controller/processor 375, which may include the memory 376, processor(s) 912, which may include the memory 916, modem 940 and which may be the entire base station 102 or a component of the base station 102, such as the TX processor 316, the RX processor 370, and/or the transceiver 902 may define a means for receiving, by a network entity from a relay UE, a remote UE RRC message for establishing a relayed communication between a remote UE and the network entity via the relay UE, wherein the remote UE RRC message includes remote UE information. For example, in an aspect, the base station 102 and/or the communication component 199/configuration component 241 may receive a wireless signal, transmitted by the relay UE, at one or more antennae or antenna arrays, demodulate and decode the signal, and/or performs other signal receiving processes such as described above in FIG. 3, and thereby obtain the remote UE RRC message.

At 704, method 700 includes establishing, by the network entity, a communication context between the remote UE, the relay UE, and the network entity based on the remote UE RRC message and the remote UE information. In an aspect, the base station 102 and/or the communication component 199/configuration component 241 may be configured to establish a communication context between the remote UE, the relay UE, and the network entity based on the remote UE RRC message and the remote UE information. As such, the base station 102 and/or the communication component 199/configuration component 241, e.g., in conjunction with the controller/processor 375, which may include the memory 376, processor(s) 912, which may include the memory 916, modem 940 and which may be the entire base station 102 or a component of the base station 102, such as the TX processor 316, the RX processor 370, and/or the transceiver 902 may define a means for establishing, by the network entity, a communication context between the remote UE, the relay UE, and the network entity based on the remote UE RRC message and the remote UE information. For example, in an aspect, the base station 102 and/or the communication component 199/configuration component 241 may obtain the remote UE RRC message and use it to establish a communication context between the remote UE, the relay UE, and the network entity, such as described above in FIG. 3, so that communications may occur between the remote UE, the relay UE, and the network entity.

At 706, method 700 includes transmitting, by the network entity to the relay UE, a second remote UE RRC message and the remote UE information. In an aspect, the base station 102 and/or the communication component 199/configuration component 241 may be configured to transmit, to the relay UE, a second remote UE RRC message and the remote UE information. As such, the base station 102 and/or the communication component 199/configuration component 241, e.g., in conjunction with the controller/processor 375, which may include the memory 376, processor(s) 912, which may include the memory 916, modem 940 and which may be the entire base station 102 or a component of the base station 102, such as the TX processor 316, the RX processor 370, and/or the transceiver 902 may define a means for transmitting, by the network entity to the relay UE, a second remote UE RRC message and the remote UE information. For example, in an aspect, the base station 102 and/or the communication component 199/configuration component 241 may modulate and encode a second remote UE RRC message and the remote UE information, and/or perform other signal transmitting processes to create a signal; transmit the wireless signal, to the relay UE, from one or more antennae or antenna arrays, such as described above in FIG. 3.

In an example of method 700, the base station 102 and/or the communication component 199/configuration component 241 configured for transmitting the second remote UE RRC message and the remote UE information is further configured for transmitting the remote UE information in an adaptation layer header for a new radio (NR) packet data convergence protocol (PDCP) packet data unit (PDU) including the second remote UE RRC message.

In an example of method 700, the base station 102 and/or the communication component 199/configuration component 241 configured for transmitting the second remote UE RRC message and the remote UE information is further configured for transmitting the remote UE information in at least one of a NR PDCP header or NR RLC header for a NR PDCP PDU including the second remote UE RRC message.

In an example of method 700, the base station 102 and/or the communication component 199/configuration component 241 configured for receiving the remote RRC message and the remote UE information is further configured for receiving the remote RRC message and the remote UE information in one or more control message, the remote UE information including a remote UE local identification and a bearer identity. For example, the one or more control messages correspond to one or more RRC messages. Further, the one or more control messages correspond to one or more new layer messages located at a layer higher than an adaptation layer.

In an example of method 700, the base station 102 and/or the communication component 199/configuration component 241 may be configured for receiving, by the network entity from the relay UE, an uplink information transfer message via a Uu radio interface. For example, the uplink information transfer messages comprises the remote UE information including a remote UE local identification and a remote UE bearer identity, and a dedicated remote UE RRC message for including the remote UE RRC message.

In an example of method 700, the base station 102 and/or the communication component 199/configuration component 241 may be configured for transmitting, by the network entity to the relay UE, a downlink information transfer message in response to receiving the uplink information transfer message. For example, the base station 102 and/or the communication component 199/configuration component 241 configured for transmitting the downlink information transfer message is further configured for transmitting a dedicated remote UE RRC message received in the downlink information transfer message to the remote UE indicated by a remote UE local identification on a corresponding PC5 bearer based on a remote UE bearer identity.

In an example of method 700, the base station 102 and/or the communication component 199/configuration component 241 may be configured for processing, by the network entity, the dedicated remote UE RRC message received in the uplink information transfer, and for associating, by the network entity, the dedicated remote UE RRC message with the communication context corresponding to the remote UE.

In an example of method 700, the base station 102 and/or the communication component 199/configuration component 241 configured for transmitting the remote RRC message and the remote UE information is further configured for transmitting a new RRC message including the remote UE information and the remote UE RRC message.

In an example of method 700, the base station 102 and/or the communication component 199/configuration component 241 configured for transmitting the remote RRC message and the remote UE information is further configured for transmitting the remote UE information and a dedicated remote UE RRC message received from the network entity via a new layer being higher than an adaptation layer.

Figure 8:
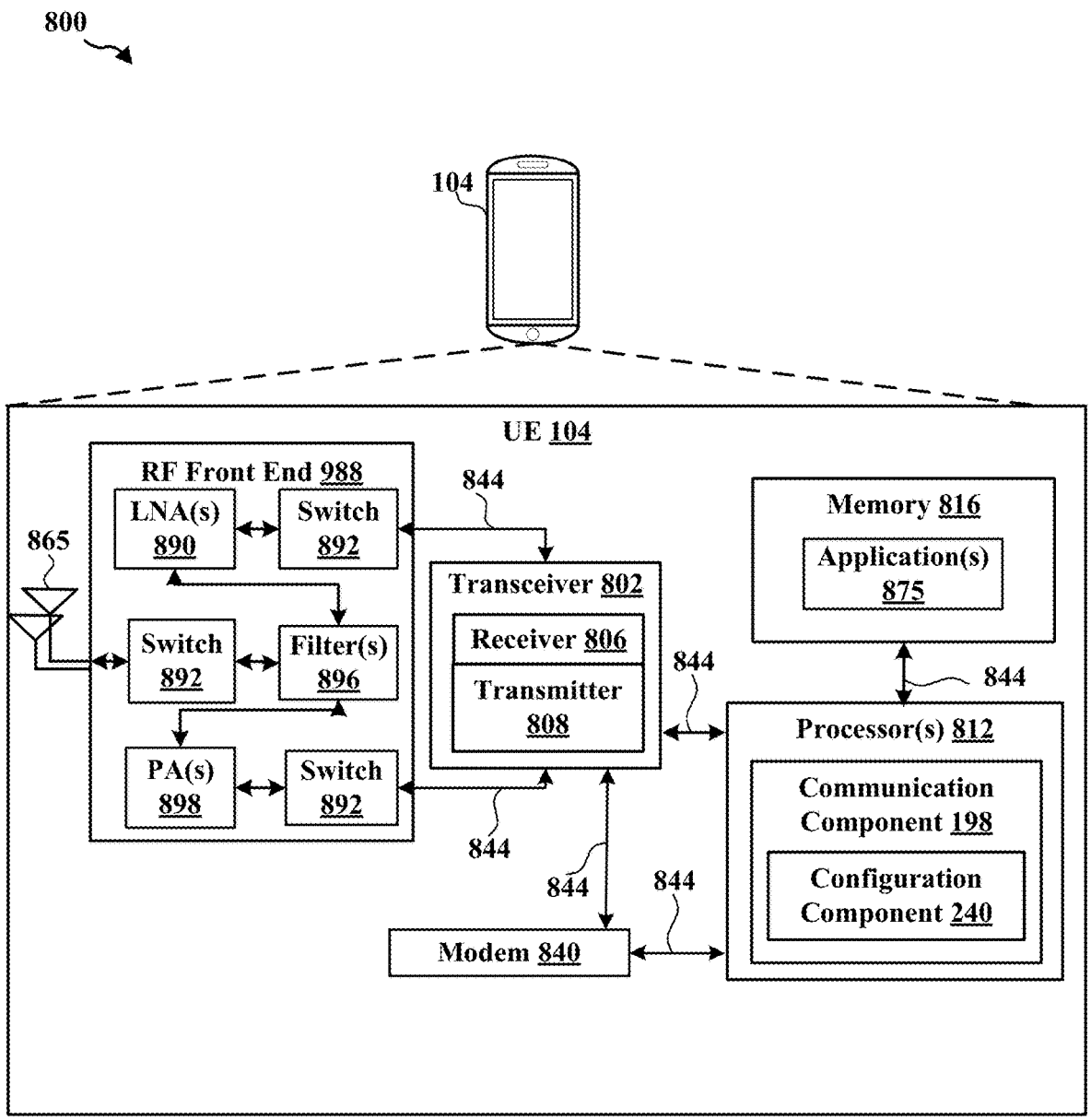
FIG. 8 is a block diagram illustrating an example of a UE, in accordance with various aspects of the present disclosure.

Referring to FIG. 8, one example of an implementation of UE 104 may include a variety of components, some of which have already been described above and are described further herein, including components such as one or more processors 812 and memory 816 and transceiver 802 in communication via one or more buses 844, which may operate in conjunction with modem 840 and/or communication component 198 for multiplexing multiple remote UEs.

In an aspect, the one or more processors 812 can include a modem 840 and/or can be part of the modem 840 that uses one or more modem processors. Thus, the various functions related to communication component 198 may be included in modem 840 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 840 associated with communication component 198 may be performed by transceiver 802.

Also, memory 816 may be configured to store data used herein and/or local versions of applications 875 or communicating component 198 and/or one or more of the subcomponents being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining communication component 198 and/or one or more of its subcomponents, and/or data associated therewith, when UE 104 is operating at least one processor 812 to execute communication component 198 and/or one or more of its subcomponents.

Transceiver 802 may include at least one receiver 806 and at least one transmitter 808. Receiver 806 may include hardware and/or software executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one base station 102. Additionally, receiver 806 may process such received signals, and also may obtain measurements of the signals, such as, but not limited to, Ec/Io, signal-to-noise ratio (SNR), reference signal received power (RSRP), received signal strength indicator (RSSI), etc. Transmitter 808 may include hardware and/or software executable by a processor for transmitting data, the code comprising instructions and being stored in a memory (e.g., computer-readable medium). A suitable example of transmitter 808 may including, but is not limited to, an RF transmitter.

Moreover, in an aspect, UE 104 may include RF front end 888, which may operate in communication with one or more antennas 865 and transceiver 802 for receiving and transmitting radio transmissions, for example, wireless communications transmitted by at least one base station 102 or wireless transmissions transmitted by UE 104. RF front end 888 may be connected to one or more antennas 865 and can include one or more low-noise amplifiers (LNAs) 890, one or more switches 892, one or more power amplifiers (PAs) 898, and one or more filters 896 for transmitting and receiving RF signals.

In an aspect, LNA 890 can amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 can be used by RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, RF front end 888 can use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver may be tuned to operate at specified frequencies such that UE 104 can communicate with, for example, one or more base stations 102 or one or more cells associated with one or more base stations 102. In an aspect, for example, modem 840 can configure transceiver 802 to operate at a specified frequency and power level based on the UE configuration of the UE 104 and the communication protocol used by modem 840.

In an aspect, modem 840 can be a multiband-multimode modem, which can process digital data and communicate with transceiver 802 such that the digital data is sent and received using transceiver 802. In an aspect, modem 840 can be multiband and be configured to support multiple frequency bands for a specific communications protocol. In an aspect, modem 840 can be multimode and be configured to support multiple operating networks and communications protocols. In an aspect, modem 840 can control one or more components of UE 104 (e.g., RF front end 888, transceiver 802) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 812 may correspond to one or more of the processors described in connection with the UE in FIG. 3. Similarly, the memory 816 may correspond to the memory described in connection with the UE in FIG. 3.

Figure 9:
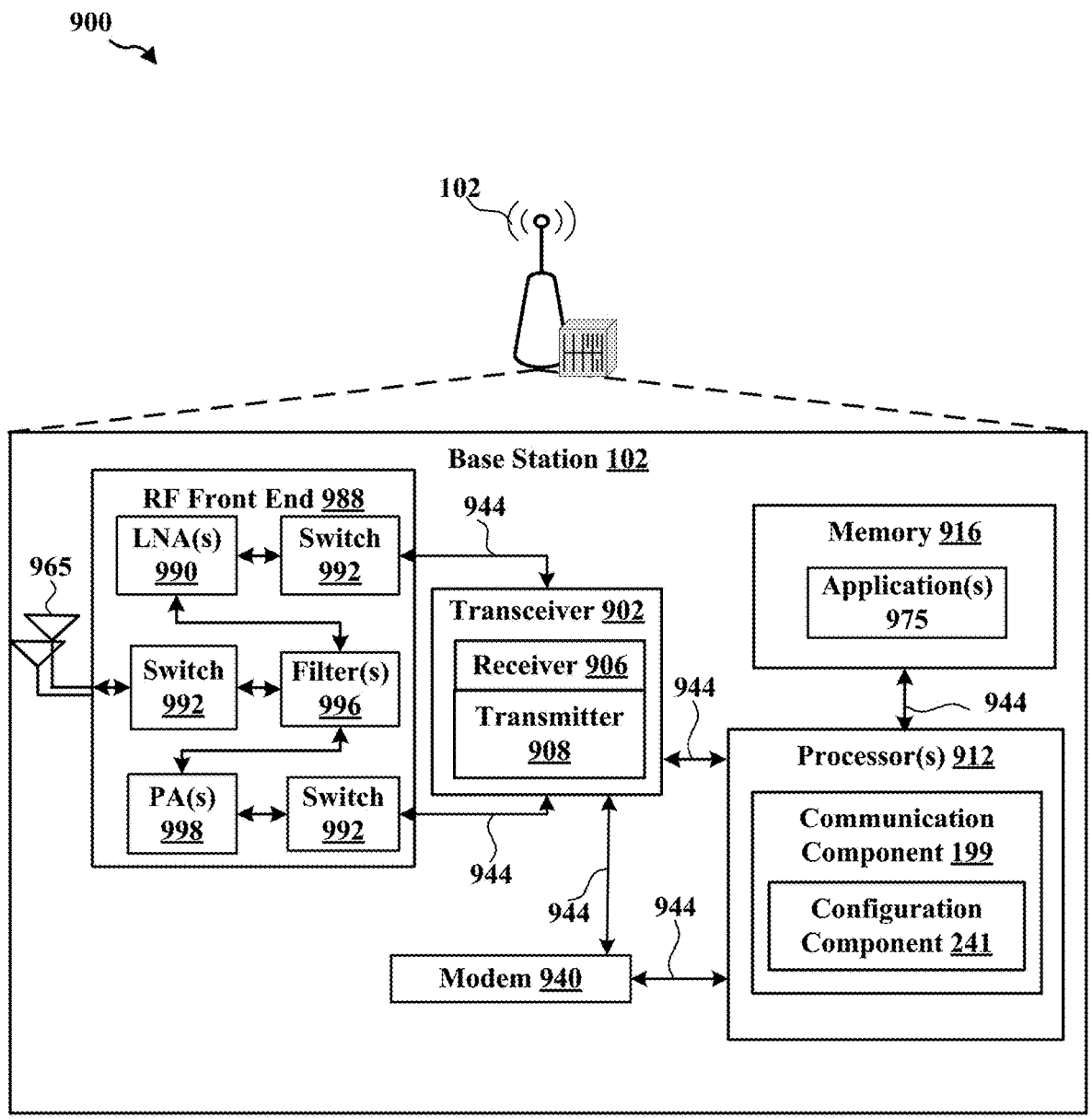
FIG. 9 is a block diagram illustrating an example of a base station, in accordance with various aspects of the present disclosure.

Referring to FIG. 9, one example of an implementation of base station 92 (e.g., a base station 92, as described above) may include a variety of components, some of which have already been described above, but including components such as one or more processors 912 and memory 916 and transceiver 902 in communication via one or more buses 944, which may operate in conjunction with modem 940 and communication component 199 for communicating reference signals.

The transceiver 902, receiver 906, transmitter 908, one or more processors 912, memory 916, applications 975, buses 944, RF front end 988, LNAs 990, switches 992, filters 996, PAs 998, and one or more antennas 965 may be the same as or similar to the corresponding components of UE 94, as described above, but configured or otherwise programmed for base station operations as opposed to UE operations.

In an aspect, the processor(s) 912 may correspond to one or more of the processors described in connection with the base station in FIG. 3. Similarly, the memory 916 may correspond to the memory described in connection with the base station in FIG. 3.

Some Further Example Clauses Implementation examples are described in the following numbered clauses:

1. A method of wireless communication, comprising:
   receiving, by a relay user equipment (UE) from a remote UE, a remote UE radio resource control (RRC) message for establishing a relayed communication between the remote UE and a network entity via the relay UE;
   determining, by the relay UE, remote UE information associated with the remote UE for establishing a remote UE communication context between the relay UE and the network entity based on the remote UE RRC message; and
   transmitting, by the relay UE to the network entity, the remote UE RRC message and the remote UE information.
2. The method of clause 1, wherein transmitting the remote RRC message and the remote UE information further comprises transmitting the remote UE information in an adaptation layer header for a new radio (NR) packet data convergence protocol (PDCP) packet data unit (PDU) including the remote UE RRC message, the remote UE information including a remote UE local identification and a bearer identity.
3. The method of any preceding clauses, further comprising:
   receiving, by the relay UE from the network entity, a second remote UE RRC message and the remote UE information at least in response to transmitting the remote UE RRC message and the remote UE information; and
   transmitting, by the relay UE to the remote UE, the remote UE RRC message.
4. The method of any preceding clauses, wherein receiving the second remote UE RRC message and the remote UE information further comprises receiving the remote UE information in an adaptation layer header for a new radio (NR) packet data convergence protocol (PDCP) packet data unit (PDU) including the second remote UE RRC message.
5. The method of any preceding clauses, wherein transmitting the remote UE RRC message and the remote UE information further comprises transmitting the remote UE information in at least one of a new radio (NR) packet data convergence protocol (PDCP) header or NR radio link control (RLC) header for a NR PDCP packet data unit (PDU) including the remote UE RRC message.
6. The method of any preceding clauses, wherein each of the at least one of the NR PDCP header or NR RLC header include at least a field for including the remote UE information.
7. The method of any preceding clauses, wherein receiving the second remote UE RRC message and the remote UE information further comprises receiving the remote UE information in at least one of a new radio (NR) packet data convergence protocol (PDCP) header or NR radio link control (RLC) header for a NR PDCP packet data unit (PDU) including the second remote UE RRC message.
8. The method of any preceding clauses, wherein transmitting the remote RRC message and the remote UE information further comprises transmitting the remote RRC message and the remote UE information in one or more control message, the remote UE information including a remote UE local identification and a bearer identity.
9. The method of any preceding clauses, wherein the one or more control messages correspond to one or more RRC messages.
10. The method of any preceding clauses, wherein the one or more control messages correspond to one or more new layer messages located at a layer higher than an adaptation layer.
11. The method of any preceding clauses, further comprising:
    transmitting, by the relay UE to the network entity, an initial remote UE RRC message configured to trigger the network entity to initiate a remote UE context setup between the relay UE and the network entity;
    receiving, by the relay UE from the network entity, a remote UE context setup request message based on transmitting the initial remote UE RRC message; and
    transmitting, by the relay UE to the network entity, a remote UE context setup response message based on receiving the remote UE context setup request message.
12. The method of any preceding clauses, wherein the remote UE context setup includes a remote UE context identification corresponding to the remote UE communication context of the remote UE.
13. The method of any preceding clauses, wherein a remote UE uplink/downlink RRC message transfer between the relay UE and the network entity utilizes the remote UE context identification.
14. The method of any preceding clauses, wherein the remote UE context setup request message includes at least a sidelink access stratum (AS) configuration utilized between the relay UE and the remote UE sidelink unicast link.
15. The method of claim 14, wherein the sidelink AS configuration includes at least one of a discontinuous reception (DRX) configuration, signaling radio bearer (SRB), dedicated radio bearer (DRB) configuration, and sidelink resource configuration.
16. The method of any preceding clauses, further comprising:
    initiating, by the relay UE, an uplink information transfer procedure in response to receiving the remote UE RRC message for establishing an uplink information transfer message to be transmitted on a Uu radio interface; and
    transmitting, by the relay UE to the network entity, the uplink information transfer message.
17. The method of any preceding clauses, wherein the uplink information transfer messages comprises the remote UE information element including a remote UE local identification and a remote UE bearer identity, and a dedicated remote UE RRC message information element for including the remote UE RRC message.
18. The method of any preceding clauses, further comprising:
    receiving, by the relay UE from the network entity, a downlink information transfer message in response to transmitting the uplink information transfer message; and
    transmitting, by the relay UE to the remote UE, the downlink information transfer message.
19. The method of any preceding clauses, wherein transmitting the downlink information transfer message further comprises transmitting a dedicated remote UE RRC message received in the downlink information transfer message to the remote UE indicated by a remote UE local identification on a corresponding PC5 bearer based on a remote UE bearer identity.
20. The method of any preceding clauses, wherein transmitting the remote RRC message and the remote UE information further comprises transmitting a new RRC message including the remote UE information and the remote UE RRC message.
21. The method of any preceding clauses, wherein transmitting the remote RRC message and the remote UE information further comprises transmitting the remote UE information and a dedicated remote UE RRC message received from the remote UE via a new layer being higher than an adaptation layer.
22. A method of wireless communication, comprising:
receiving, by a network entity from a relay user equipment (UE), a remote UE radio resource control (RRC) message for establishing a relayed communication between a remote UE and the network entity via the relay UE, wherein the remote UE RRC message includes remote UE information;
establishing, by the network entity, a communication context between the remote UE, the relay UE, and the network entity based on the remote UE RRC message and the remote UE information; and
transmitting, by the network entity to the relay UE, a second remote UE RRC message and the remote UE information.
23. The method of clause 22, wherein transmitting the second remote UE RRC message and the remote UE information further comprises transmitting the remote UE information in an adaptation layer header for a new radio (NR) packet data convergence protocol (PDCP) packet data unit (PDU) including the second remote UE RRC message.
24. The method of any preceding clauses, wherein transmitting the second remote UE RRC message and the remote UE information further comprises transmitting the remote UE information in at least one of a new radio (NR) packet data convergence protocol (PDCP) header or NR radio link control (RLC) header for a NR PDCP packet data unit (PDU) including the second remote UE RRC message.
25. The method of any preceding clauses, wherein receiving the remote RRC message and the remote UE information further comprises receiving the remote RRC message and the remote UE information in one or more control message, the remote UE information including a remote UE local identification and a bearer identity.
26. The method of any preceding clauses, further comprising receiving, by the network entity from the relay UE, an uplink information transfer message via a Uu radio interface.
27. The method of any preceding clauses, wherein the uplink information transfer messages comprises the remote UE information including a remote UE local identification and a remote UE bearer identity, and a dedicated remote UE RRC message for including the remote UE RRC message.
28. The method of any preceding clauses, further comprising:
transmitting, by the network entity to the relay UE, a downlink information transfer message in response to receiving the uplink information transfer message;
processing, by the network entity, the dedicated remote UE RRC message received in the uplink information transfer; and
associating, by the network entity, the dedicated remote UE RRC message with the communication context corresponding to the remote UE.
29. An apparatus for wireless communication, comprising:
a transceiver;
a memory configured to store instructions; and
one or more processors communicatively coupled with the transceiver and the memory, wherein the one or more processors are configured to execute the instructions to:
receive, by a relay user equipment (UE) from a remote UE, a remote UE radio resource control (RRC) message for establishing a relayed communication between the remote UE and a network entity via the relay UE;
determine, by the relay UE, remote UE information associated with the remote UE for establishing a remote UE communication context between the relay UE and the network entity based on the remote UE RRC message; and
transmit, by the relay UE to the network entity, the remote UE RRC message and the remote UE information.
30. An apparatus for wireless communication, comprising:
a transceiver;
a memory configured to store instructions; and
one or more processors communicatively coupled with the transceiver and the memory, wherein the one or more processors are configured to execute the instructions to:
receive, by a network entity from a relay user equipment (UE), a remote UE radio resource control (RRC) message for establishing a relayed communication between a remote UE and the network entity via the relay UE, wherein the remote UE RRC message includes remote UE information;
establish, by the network entity, a communication context between the remote UE, the relay UE, and the network entity based on the remote UE RRC message and the remote UE information; and
transmit, by the network entity to the relay UE, a second remote UE RRC message and the remote UE information.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   receiving, by a relay user equipment (UE) from a remote UE, a remote UE radio resource control (RRC) message for establishing a relayed communication between the remote UE and a network entity via the relay UE;
   determining, by the relay UE, remote UE identification information associated with the remote UE for establishing a remote UE communication context between the relay UE and the network entity based on the remote UE RRC message; and
   transmitting, by the relay UE to the network entity, the remote UE RRC message and the remote UE identification information in an adaptation layer header for a 5G new radio packet data convergence protocol (NR-PDCP) packet data unit (PDU) including the remote UE RRC message, the remote UE identification information including a remote UE local identifier and a bearer identity, wherein the NR-PDCP PDU relays control plane information between the remote UE and the network entity.

2. The method of claim 1, further comprising:
   receiving, by the relay UE from the network entity, a second remote UE RRC message and the remote UE information at least in response to transmitting the remote UE RRC message and the remote UE information; and
   transmitting, by the relay UE to the remote UE, the remote UE RRC message.

3. The method of claim 2, wherein receiving the second remote UE RRC message and the remote UE information further comprises receiving the remote UE identification information in the adaptation layer header for the 5G new radio packet data convergence protocol (NR-PDCP) PDU including the second remote UE RRC message.

4. The method of claim 2, wherein receiving the second remote UE RRC message and the remote UE information further comprises receiving the remote UE identification information in at least one of the adaptation layer header for an 5G new radio packet data convergence protocol (NR-PDCP) PDU or a radio link control (RLC) header for a RLC PDU including the second remote UE RRC message.

5. The method of claim 1, wherein transmitting the remote UE RRC message and the remote UE information further comprises transmitting the remote UE identification information in at least one of the adaptation layer header for the 5G new radio packet data convergence protocol (NR-PDCP) PDU or a radio link control (RLC) header for a RLC PDU including the remote UE RRC message.

6. The method of claim 5, wherein each of the at least one of the adaptation layer header or the RLC header include at least a field for including the remote UE information.

7. The method of claim 1, wherein transmitting the remote RRC message and the remote UE information further comprises transmitting the remote RRC message and the remote UE information in one or more control messages.

8. The method of claim 7, wherein the one or more control messages correspond to one or more RRC messages.

9. The method of claim 7, wherein the one or more control messages correspond to one or more new layer messages located at a layer higher than an adaptation layer.

10. The method of claim 7, further comprising:
    transmitting, by the relay UE to the network entity, an initial remote UE RRC message configured to trigger the network entity to initiate a remote UE context setup between the relay UE and the network entity;
    receiving, by the relay UE from the network entity, a remote UE context setup request message based on transmitting the initial remote UE RRC message; and
    transmitting, by the relay UE to the network entity, a remote UE context setup response message based on receiving the remote UE context setup request message.

11. The method of claim 10, wherein the remote UE context setup includes a remote UE context identification corresponding to the remote UE communication context of the remote UE.

12. The method of claim 11, wherein a remote UE uplink/downlink RRC message transfer between the relay UE and the network entity utilizes the remote UE context identification.

13. The method of claim 10, wherein the remote UE context setup request message includes at least a sidelink access stratum (AS) configuration utilized between the relay UE and the remote UE sidelink unicast link.

14. The method of claim 13, wherein the sidelink AS configuration includes at least one of a discontinuous reception (DRX) configuration, signaling radio bearer (SRB), dedicated radio bearer (DRB) configuration, and sidelink resource configuration.

15. The method of claim 7, further comprising:
    initiating, by the relay UE, an uplink information transfer procedure in response to receiving the remote UE RRC message for establishing an uplink information transfer message to be transmitted on a Uu radio interface; and
    transmitting, by the relay UE to the network entity, the uplink information transfer message.

16. The method of claim 15, wherein the uplink information transfer messages comprises the remote UE information element including a remote UE local identification and a remote UE bearer identity, and a dedicated remote UE RRC message information element for including the remote UE RRC message.

17. The method of claim 15, further comprising:
receiving, by the relay UE from the network entity, a downlink information transfer message in response to transmitting the uplink information transfer message; and
transmitting, by the relay UE to the remote UE, the downlink information transfer message.

18. The method of claim 17, wherein transmitting the downlink information transfer message further comprises transmitting a dedicated remote UE RRC message received in the downlink information transfer message to the remote UE indicated by a remote UE local identification on a corresponding PC5 bearer based on a remote UE bearer identity.

19. The method of claim 1, wherein transmitting the remote RRC message and the remote UE information further comprises transmitting a new RRC message including the remote UE information and the remote UE RRC message.

20. The method of claim 1, wherein transmitting the remote RRC message and the remote UE information further comprises transmitting the remote UE information and a dedicated remote UE RRC message received from the remote UE via a new layer being higher than an adaptation layer.

21. The method of claim 1, wherein transmitting the remote UE RRC message and the remote UE information further comprises transmitting the remote UE information via an adaptation layer configured over an radio link control (RLC) sublayer for both a control plane (CP) and a user plane (UP) between the relay UE and the network entity.

22. A method of wireless communication, comprising:
receiving, by a network entity from a relay user equipment (UE), a remote UE radio resource control (RRC) message for establishing a relayed communication between a remote UE and the network entity via the relay UE, the remote UE RRC message including remote UE information;
establishing, by the network entity, a communication context between the remote UE, the relay UE, and the network entity based on the remote UE RRC message and the remote UE identification information; and
transmitting, by the network entity to the relay UE, a second remote UE RRC message and the remote UE identification information in an adaptation layer header for a 5G new radio packet data convergence protocol (NR-PDCP) packet data unit (PDU) including the second remote UE RRC message; wherein the NR-PDCP PDU relays control plane information between the remote UE and the network entity.

23. The method of claim 22, wherein transmitting the second remote UE RRC message and the remote UE information further comprises transmitting the remote UE information in at least one of the adaptation layer header or radio link control (RLC) header for a RLC PDU including the second remote UE RRC message.

24. The method of claim 22, wherein receiving the remote RRC message and the remote UE information further comprises receiving the remote RRC message and the remote UE information in one or more control messages, the remote UE information including a remote UE local identifier and a bearer identity.

25. The method of claim 24, further comprising receiving, by the network entity from the relay UE, an uplink information transfer message via a Uu radio interface.

26. The method of claim 25, wherein the uplink information transfer message comprises the remote UE information including a remote UE local identification and a remote UE bearer identity, and a dedicated remote UE RRC message information element for including the remote UE RRC message.

27. The method of claim 25, further comprising:
transmitting, by the network entity to the relay UE, a downlink information transfer message in response to receiving the uplink information transfer message;
processing, by the network entity, the dedicated remote UE RRC message received in the uplink information transfer; and
associating, by the network entity, the dedicated remote UE RRC message with the communication context corresponding to the remote UE.

28. An apparatus for wireless communication, comprising:
a transceiver;
a memory configured to store instructions; and
one or more processors communicatively coupled with the transceiver and the memory, the one or more processors configured to execute the instructions to:
receive, by a relay user equipment (UE) from a remote UE, a remote UE radio resource control (RRC) message for establishing a relayed communication between the remote UE and a network entity via the relay UE;
determine, by the relay UE, remote UE identification information associated with the remote UE for establishing a remote UE communication context between the relay UE and the network entity based on the remote UE RRC message; and
transmit, by the relay UE to the network entity, the remote UE RRC message and the remote UE identification information in an adaptation layer header for a 5G new radio packet data convergence protocol (NR-PDCP) packet data unit (PDU) including the remote UE RRC message, the remote UE identification information including a remote UE local identifier and a bearer identity; wherein the NR-PDCP PDU relays control plane information between the remote UE and the network entity.

29. The method of claim 22, wherein transmitting the second remote UE RRC message and the remote UE information further comprises transmitting the remote UE information via an adaptation layer configured over an radio link control (RLC) sublayer for both a control plane (CP) and a user plane (UP) between the relay UE and the network entity.

30. An apparatus for wireless communication, comprising:
a transceiver;
a memory configured to store instructions; and
one or more processors communicatively coupled with the transceiver and the memory, the one or more processors configured to execute the instructions to:
receive, by a network entity from a relay user equipment (UE), a remote UE radio resource control (RRC) message for establishing a relayed communication between a remote UE and the network entity via the relay UE, the remote UE RRC message including remote UE information;
establish, by the network entity, a communication context between the remote UE, the relay UE, and the network entity based on the remote UE RRC message and the remote UE identification information; and
transmit, by the network entity to the relay UE, a second remote UE RRC message and the remote UE identification information in an adaptation layer header for a 5G new radio packet data convergence protocol (NR-PDCP) packet data unit (PDU) including the second remote UE RRC message; wherein the NR-PDCP PDU relays control plane information between the remote UE and the network entity.

* * * * *